US006275756B1

(12) United States Patent
Griggs et al.

(10) Patent No.: US 6,275,756 B1
(45) Date of Patent: Aug. 14, 2001

(54) SMART IGNITOR CONTROL SYSTEM

(75) Inventors: James W. Griggs, Bradenton; Clinton Boyd, Kissimmee; Michael Sutherland, Orlando; Scott D. Gagnon, Dover, all of FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/598,860

(22) Filed: Jun. 21, 2000

(51) Int. Cl.[7] .............................. B60R 21/16; B60R 21/32
(52) U.S. Cl. ........................... 701/45; 701/46; 280/728.1; 280/734; 342/72
(58) Field of Search .................................. 701/45, 46, 47; 280/728.1, 735, 730.2, 734; 180/268, 282; 342/72; 340/436

(56) References Cited

U.S. PATENT DOCUMENTS

| 4,843,964 | | 7/1989 | Bickes et al. ............. 102/202.5 |
|---|---|---|---|
| 5,261,694 | * | 11/1993 | White et al. ................. 280/735 |
| 5,554,890 | | 9/1996 | Kinoshita ..................... 307/10.1 |
| 5,659,474 | | 8/1997 | Maeno et al. .................. 364/424 |
| 5,666,065 | * | 9/1997 | Ravas et al. ................... 324/769 |
| 5,802,480 | * | 9/1998 | Shiraishi ........................ 701/45 |
| 5,872,460 | * | 2/1999 | Bennett et al. ................. 324/769 |
| 5,938,708 | * | 8/1999 | Wallace et al. ................. 701/48 |
| 5,954,360 | * | 9/1999 | Briggs, II et al. .............. 280/735 |
| 5,957,988 | | 9/1999 | Osajda et al. ................... 701/45 |
| 6,026,340 | * | 2/2000 | Corrado et al. ................. 701/47 |
| 6,036,225 | * | 3/2000 | Foo et al. ..................... 280/735 |
| 6,068,287 | | 5/2000 | Nitschke et al. ............... 280/735 |
| 6,116,639 | * | 9/2000 | Breed et al. ................... 280/735 |
| 6,166,452 | | 12/2000 | Adams et al. ................. 307/10.1 |

FOREIGN PATENT DOCUMENTS

| 4300351 | 1/1993 | (DE) . |
|---|---|---|
| 19721839 | 10/1998 | (DE) . |
| WO97/28992 | 8/1997 | (WO) . |

* cited by examiner

Primary Examiner—Tan Nguyen
Assistant Examiner—Dalena Tran
(74) Attorney, Agent, or Firm—Lonnie Drayer; Patrick Steinnon

(57) ABSTRACT

A smart ignitor control system has communications output electronic circuitry and communications input electronic circuitry. The communications output electronic circuitry generates output serial clock, data, and handshaking signals for communication with a master ASIC that is adapted to communicate with a smart ignitor. The communications input electronic circuitry inputs data and handshaking signals from a master ASIC. Smart ignitors are in circuit communication with the master ASIC via an ignitor bus. Optionally, additional circuitry digitizes analog voltages and waveforms from the ignitor bus and transmits the digitized data to an electronic information processor.

6 Claims, 12 Drawing Sheets

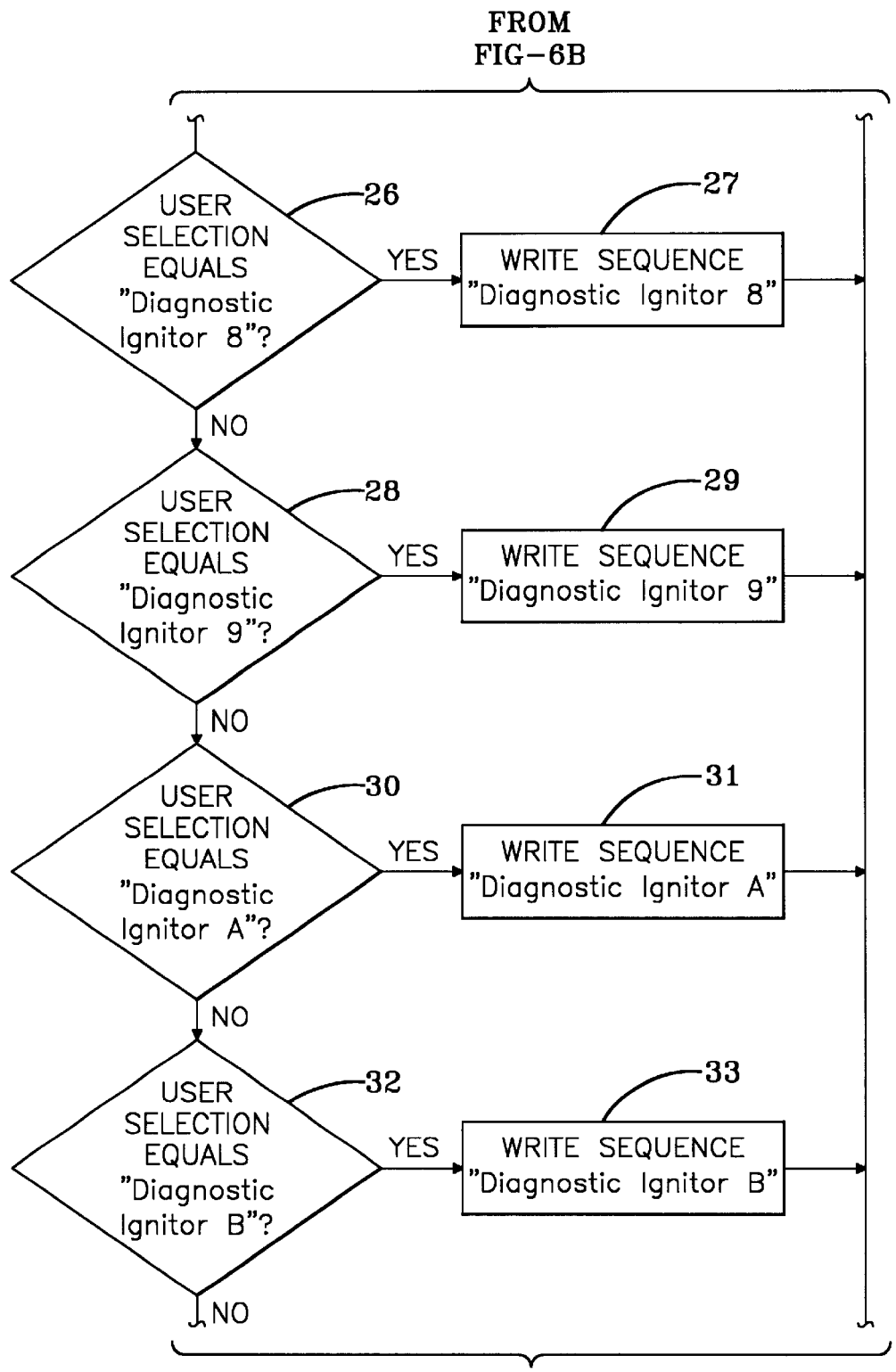

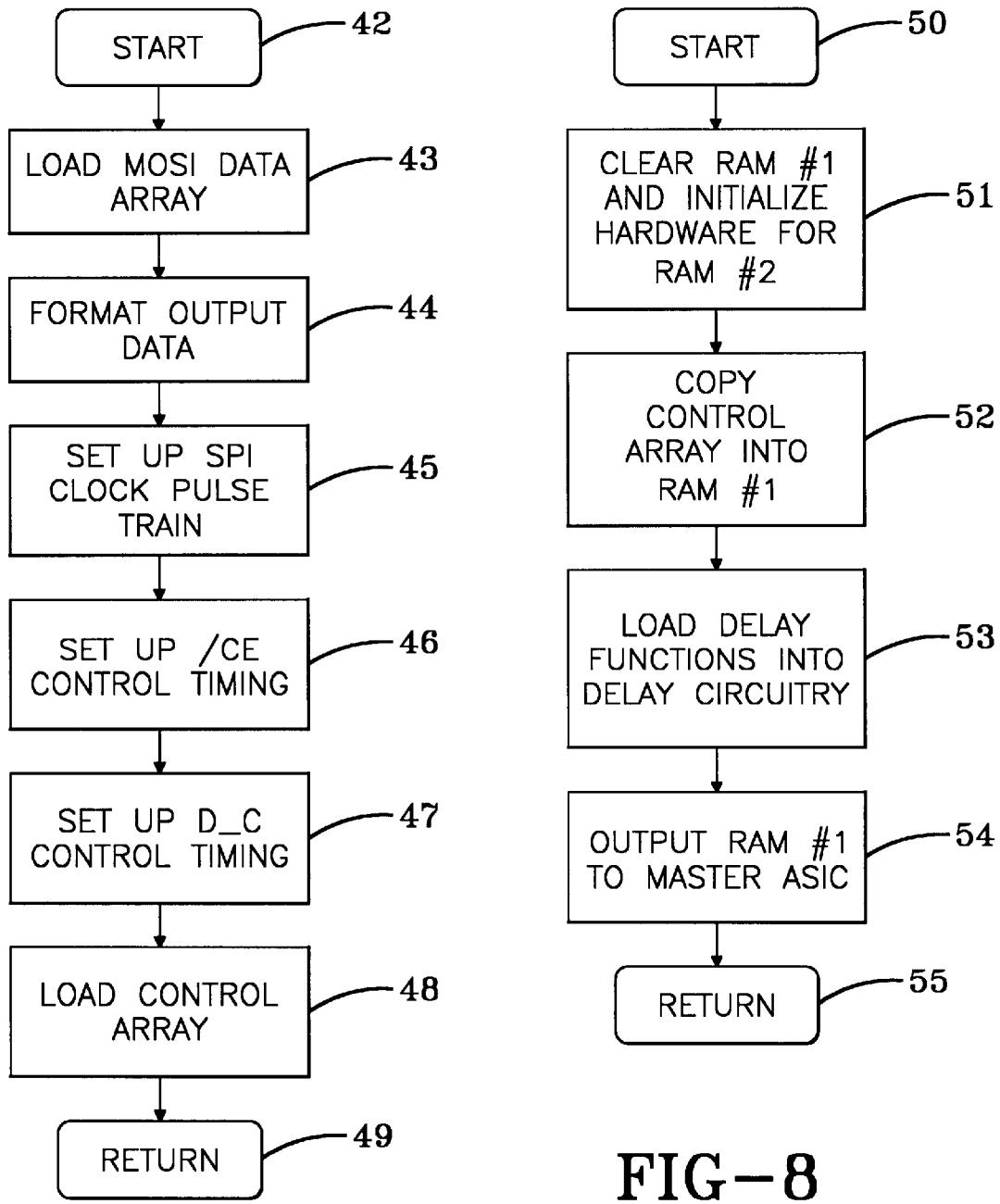

SMART IGNITOR CONTROL SYSTEM

FIELD OF THE INVENTION

The present invention relates to an apparatus for control, communication, status acquisition, archival, and linking of a smart ignitor control system.

BACKGROUND OF THE INVENTION

There are several scenarios in which it is desirable to selectively ignite separate units of reactive materials either simultaneously or sequentially depending upon selected variables. Motor vehicles are equipped with airbags and seat belts to protect vehicle occupants in the event of a crash. There is a desire to provide so called smart, or intelligent, safety systems that will take into accounts the size and position of vehicle occupants as well as the type and severity of a crash in determining which safety devices will be deployed and the manner of deployment. There is a need in the field of pyrotechnically activated vehicle occupant restraints, such as airbags and seat belt pretensioners for a method to control and perform diagnostics on a system of pyrotechnic ignitors called "smart ignitors" or "smart squibs". Smart ignitors are pyrotechnic ignitors that can be electrically connected in parallel each with a unique address that allows each smart ignitor to be individually controlled, communicated with or have its status interrogated. The use of smart ignitors allows a more cost effective and reliable implementation of vehicle safety devices including but not limited to variably deployable frontal airbags, side airbags, inflatable side curtains, and seat belt pretensioner safety systems than could be done otherwise. Smart ignitors may be used in the activation of gas generating devices, opening containers of stored gas, and hybrid type inflators. It would also be advantageous to have similar capabilities for selectively igniting various units of reactive materials, such as explosives, in mining or demolition operations.

The smart ignitor control system disclosed herein can validate the functionality, control the timing and sequence of the deployment of the smart ignitors of a vehicle safety system in the event of a crash, or when explosives are used in mining or demolition operations.

SUMMARY OF THE INVENTION

There is provided in accordance with one aspect of the smart ignitor control system comprising: (a) a communications output electronic circuitry that generates output serial clock, data, and handshaking signals for communication with a master ASIC that is adapted to communicate with a smart ignitor and (b) a communications input electronic circuitry that inputs data and handshaking signals from a master ASIC.

The communications output electronic circuitry may comprise: (i) data interface circuitry connecting an electronic information processor to a memory device; (ii) data interface circuitry for connecting a master ASIC to a memory device; and (iii) control circuitry controlling the functions of the interface circuitry and memory device.

The communications input electronic circuitry may comprise: (i) data interface circuitry connecting the electronic information processor to a memory device, (ii) data interface circuitry for connecting a master ASIC to the memory and (iii) control circuitry controlling the functions of the interface circuitry and memory device.

Optionally, an additional circuit is included that digitizes ignitor bus analog voltages and waveforms, stored the data in a memory device then uploaded to the electronic information processor. The electronic information processor software then performs functions such as but not limited to decoding, analyzing, displaying, archiving, and linking the data in the second memory device to other components such as but not limited to a electronic information processor screen, hardware indicators, one or more database engines, internet gateways, neural network an d expert systems.

DISCUSSION OF THE PRIOR ART

U.S. Pat. No. 5,957,988 teaches a control circuit for controlling power supplied to an ignitor element but the control circuit is hardware in a permanent configuration rather than being software that can be easily adapted to particular applications as in the present invention.

U.S. Pat. No. 4,843,964 teaches a smart explosive ignitor and a device for sending an activation signal to the ignitor.

U.S. Pat. Nos. 5,554,890 5,659,474 6,068,287 and PCT publication WO 97/28992 teach systems for controlling the activation of ignitors and/or diagnosing systems for controlling the activation of ignitors, but do not disclose the use of smart ignitors in such systems.

BRIEF DESCRIPTION OF THE DRAWINGS

The invention may take physical form in certain parts and arrangement and electronic design and configuration of parts, a preferred embodiment of that will be described in detail and illustrated in the accompanying drawings which form a part hereof.

FIGS. 6A to 6D are a flow chart of a software routine called "OnExecute" which is executed when the user selects a sequence from a pull-down control on the user interface.

FIG. 7 is a flow chart of a software routine called "OnExecuteWrite" that is executed when the user initiates the sequence list control on the user interface.

FIG. 8 is a flow chart of a software subroutine called "FlashWrt" that is executed when the user initiates the control button "EXECUTE" on the user interface.

DETAILED DESCRIPTION OF THE INVENTION

As used herein and in the claims the term "smart ignitor" and "smart ignitors" are understood to mean pyrotechnic ignitors that can be electrically connected in parallel each with a unique address which allows each smart ignitor to be individually controlled, communicated with or have its status interrogated. It is understood in the art that the term "squib" is synonymous with "ignitor".

Figure 11:
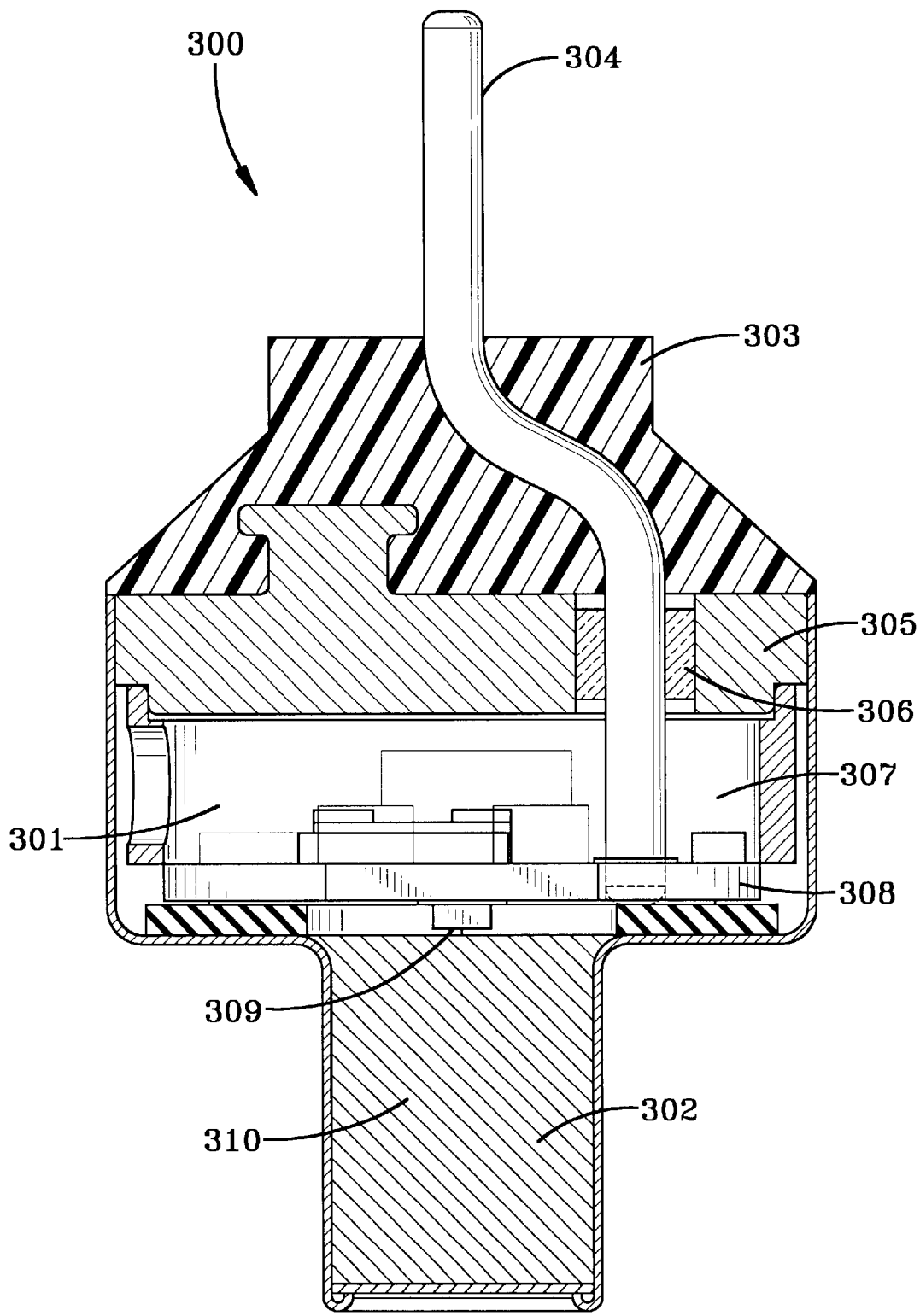
FIG. 11 is a cross section of a smart ignitor.

FIG. 11 is a cross section of a smart ignitor 300 that has been disclosed in commonly owned U.S. Pat. No. 6,166,452 to Adams et al. filed Jan. 20, 1999. It is understood that the smart ignitor control system of the present invention may be employed with any suitable smart ignitor as defined above, and that the smart ignitor shown in FIG. 11 and described herein is merely exemplary.

In the exemplary smart ignitor 300 has a plastic end cap 303 provided on one end thereof. A metallic pin 304 passes through the end cap. In a preferred embodiment, the ignitor could contain two pins, one pin acting as a power supply pin and the other acting as a return pin, which would create an interface that is polarity independent. The pins perform the functions of conducting power to the ignitor and conducting digital communication signals between a slave ASIC in the ignitor and a master ASIC (102 in FIGS. 1 and 2). The slave ASIC in each ignitor performs important function including, but not limited to, communicating with the master ASIC, diagnosing the functionality of the ignitor, maintaining a unique digital address for the particular ignitor (this address may be assigned either before or after installation of the ignitor in a particular safety device or location in a mining, demolition or construction scheme), controlling a charge pump, and activating a heating element such as a semiconductor bridge or hot wire. Of course, if desired, a three-pin configuration, with two pins for the power supply and a third pin for conducting digital transmission signals could be employed.

A metal disk 305 is provided directly below the end cap 303. A seal is formed between the electrically conductive pin 304 and the metal disk 305 by any suitable means such as placing a glass tube 306 around the electrically conductive pin. The glass acts as a sealant and also as an electrical insulator between the metal disk 305 and the electrically conductive pins. It is understood that any other suitable means of insulating the electrically conductive pins from the metal disk may be employed.

A circuit board 308 with a slave ASIC thereon lies alongside the bottom of a metal ring 307, which is connected to the metal disk 305. The metal disk along with the metal ring and the circuit board combine to form a chamber 301. The electrically conductive pin 304 is secured to the circuit board using an electrically conductive epoxy.

A heating element 309 is located on the side of the circuit board that faces away from the chamber 301. The gas generating reaction in most gas generators, (or explosion in the case of demolition or mining operations), is initiated with a heating member that is a bridgewire. A bridgewire material is selected from high melting temperature metal alloys that are corrosion resistant, tough enough to withstand reactive material loading pressures and that can be welded or soldered to electrical connectors. An electrical current passes through the bridgewire and generates heat that ignites the reactive material 310. The reactive material is stored in a chamber 302. However, it is preferred that the heating member of an ignitor be a semiconductor bridge. A semiconductor bridge comprises a non-metallic substrate that carries a semiconductor layer, preferably comprising a doped silicon. A pair of electrically conductive lands, fabricated for example of aluminum or tungsten, are deposited on the semiconductor layer such that a gap separates the lands. A reactive material contacts the lands and bridges the gap. When electricity of sufficient voltage and current is applied across the gap via the lands, a plasma is established in the gap. The plasma initiates the reactive material, which in turn initiates an enhancer, which in turn initiates the gas generating propellant in the inflator or an explosive material in a mining or demolition operation.

In this exemplary smart ignitor it is recommended that the chamber 301 be filled with an epoxy material, such as HYSOL-FD4450 HF from Dexter. The epoxy has a dual role; first, the epoxy provides support for the circuit board, and second, the epoxy prevents the circuit board from damage during the tamping procedure. In a preferred embodiment, a reactive material is in powered or granular form and is tamped into the chamber 302 using a force of about 680 atmospheres (10,000 pounds per square inch). Thus, the epoxy is required to prevent the circuit board from shifting or moving during the tamping procedure.

Smart ignitors may be used in substantially any application where ordinary ignitors are currently used. Smart ignitors may be used in gas generating devices associated with vehicle occupant protection systems (such as airbags and seat belt pretensioners). Smart ignitors may be for opening gas storage devices associated with vehicle occupant protection systems (such as airbags and seat belt pretensioners), or gas storage devices used in fire suppression systems or any other suitable application where the rapid opening of a stored gas container is required. Smart ignitors may be used in hybrid devices wherein gas is both generated and released from a storage compartment. Furthermore smart ignitors may be used in the detonation of explosive devices for example in mining, construction or demolition operations.

An automotive safety system using smart ignitors, for example airbag and seat belt safety systems, has a plurality of smart ignitors electrically connected in parallel using a common two wire bus. An ignitor bus 206 is located between the master ASIC 102 and a plurality of smart ignitors 103. This bus supplies power and a two-way communications path for the smart ignitors. Each smart ignitor has a unique bus address allowing it to be controlled, tested and communicated with individually.

A smart ignitor control system should address the following functions: (a) duplex communications; (b) dynamic and field modifiable instruction sets and program sequences; (c) suitablity for research and development, production and test applications as well as actual vehicle applications; (d) capacity in research and development, production and test applications to be scaled up, and portable with high reliability; (e) ability to integrate the system with database and other applications.

Figure 1:
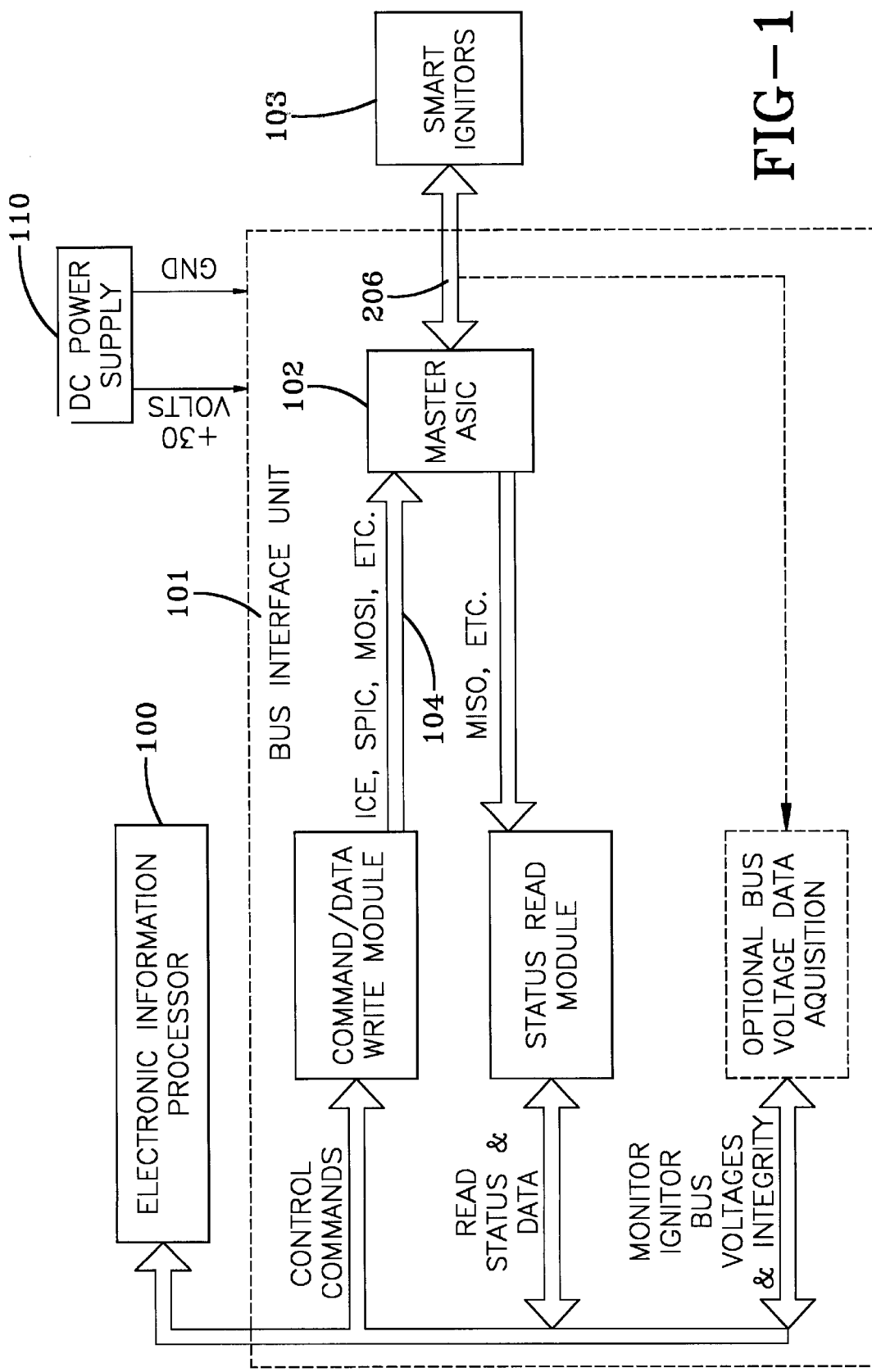
FIG. 1 is a block diagram of a smart ignitor control system in accordance with the present invention.

FIG. 1 is a block diagram of a smart ignitor control system in accordance with the present invention. The top level components of the smart ignitor control system include a an electronic information processor 100, a bus interface unit 101 with a power supply 110, and smart ignitors 103 having slave ASICS that communicate with a master ASIC 102. The electronic information processor may be a computer, microprocessor, ASIC or any suitable programmable digital or analog logic controller with memory. A prototype a smart ignitor control system intended for use in research and developments production and test applications has an electronic information processor comprising a computer using MICROSOFT WINDOWS 95, (MICROSOFT WINDOWS 98 or NT could also be used), with an application program in MICROSOFT VISUAL C++ (a programming language), and a DIO-96 interface card available from National Instruments.

In the prototype device the electronic information processor receives input from a keyboard. However; depending upon a particular application for the device the electronic information processor may receive input from sensors that sense a crash, conditions indicating the proper conditions for a high probability of an impending crash, or a switch or timer (as in a static test or mining or demolition application), or sensors that sense the size, and/or location, and/or position of a vehicle occupant. As used herein and in the claims the term "crash" is understood to mean all manners of crashes including, but not limited to, frontal crashes, side crashes, rear crashes, rollovers and so forth.

Figure 2:
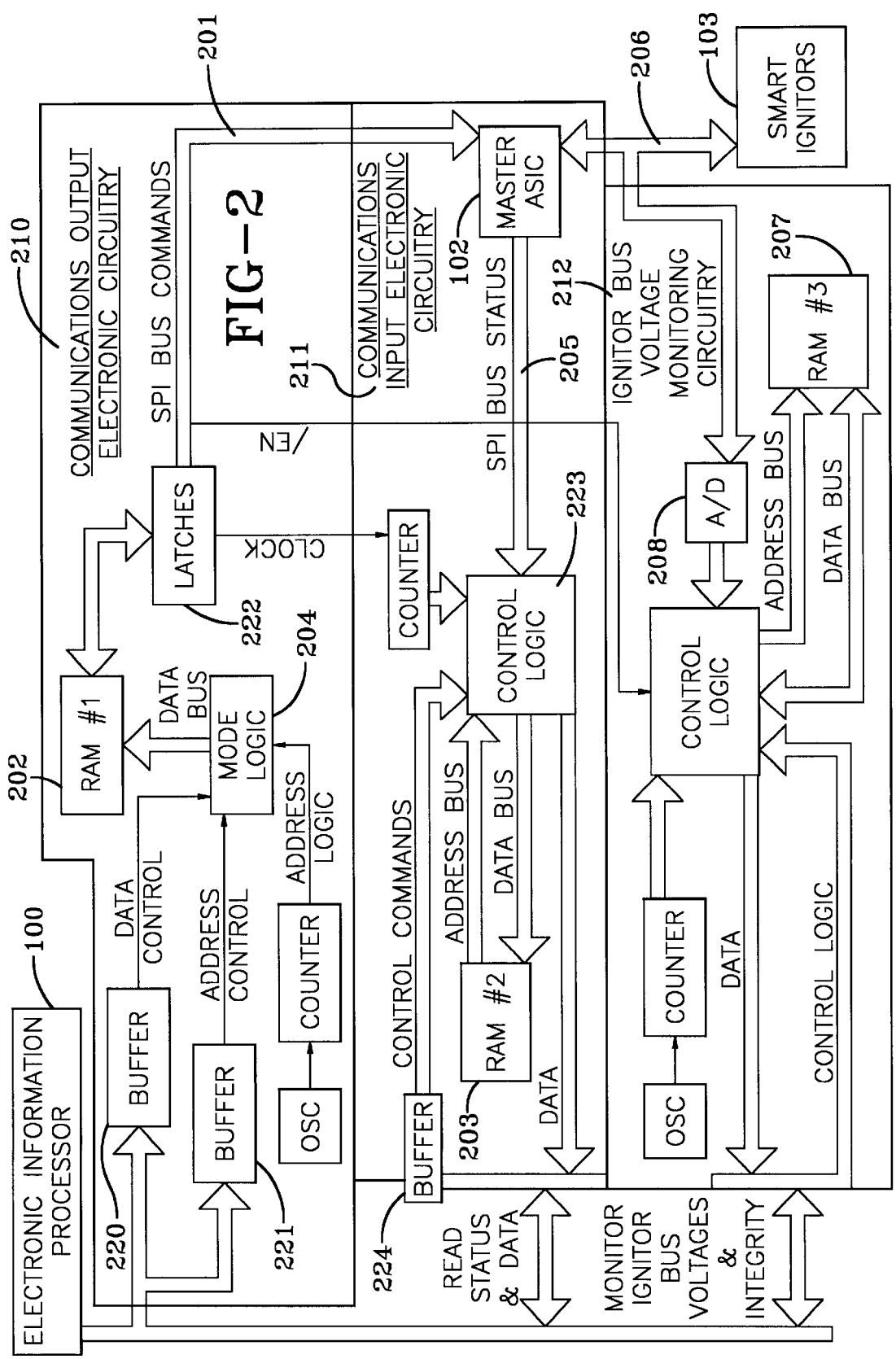
FIG. 2 is another block diagram of the smart ignitor control system shown in FIG. 1 showing more details.

FIG. 2 is a more detailed block diagram of the smart ignitor control system of FIG. 1 showing in detail function blocks in the communications output electronic circuitry 210, communications input electronic circuitry 211, and optional ignitor bus voltage monitoring circuitry 212.

Basically, the smart ignitor control system of the present invention has: (a) communications output electronic circuitry 210 that generates output serial clock, data, and handshaking signals for communication with a master ASIC 102 that is adapted to communicate with smart ignitors 103; and (b) communications input electronic circuitry 211 that inputs data and handshaking signals from a master ASIC 102.

In the prototype device the master ASIC is an integral component of the device. However, it is understood that the master ASIC may be provided as a component of the smart ignitor control system or may be provided as a separate component that is connectable to a smart ignitor control system and a smart ignitor.

The communications output electronic circuitry in the prototype comprises: (i) data interface circuitry connecting an electronic information processor 100 to a first memory device 202; (ii) data interface circuitry for connecting a master ASIC 102 to a second memory device 203; and (iii) control circuitry controlling the functions of the interface circuitry 220, 221 and memory devices 202, 203.

The communications input electronic circuitry in the prototype comprises: (i) data interface circuitry connecting the electronic information processor 100 to a memory device 203; (ii) data interface circuitry 224 for connecting a master ASIC 102 to the memory device 203; and (iii) control circuitry 223 controlling the functions of the interface circuitry and memory device 203.

The prototype includes optional ignitor bus voltage monitoring circuitry 212 with a converter 208 that digitizes the ignitor bus 206 analog voltages and waveforms, stores the data in a memory device 207 then upload the data to the electronic information processor 100. The electronic information processor software then performs functions such as, but not limited to, decoding, analyzing, displaying, archiving, and linking the data in the second memory device 203 to other components such as but not limited to an electronic information processor screen, hardware indicators, one or more database engines, internet gateways, neural networks and expert systems.

The memory devices 202, 203 207 may be any suitable type of memory device such as flash memory, EPROM, EEPROM, PROM, ROM, static random access memory (RAM), or dynamic RAM. In the prototype device RAM #1 202 is flash memory, RAM #2 203 and RAM #3 207 are static RAMs.

The smart ignitor control system has circuit architecture with data lines 201 carrying SPI BUS COMMANDS including, but not limited to, clock, data, and handshaking lines to the master ASIC 102 which in turn communicates with the smart ignitors 103. In the prototype these binary patterns are downloaded from the electronic information processor 100. This technique allows the serial communications outputs to be changed dynamically without electronic hardware changes (such as but not limited to EPROM's alterations). The communication outputs from the smart ignitors 103 are stored in RAM #2 203. The contents of RAM #2 are uploaded to the electronic information processor 100. The electronic information processor may be connected to systems such as, but not limited to, database engines, internet gateways, neural network and expert systems. The software in the electronic information processor may be changed or upgraded (and thus the downloaded contents and functions in RAM #1 202) thus making the system reconfigurable, scalable and expandable.

The status information, activation and deployment timing and deployment sequence of the smart ignitors in the smart ignitor safety system can be controlled and tailored to a vehicle occupant's characteristics and safety requirements.

The functioning of the prototype device for product research and development and production tests can best be understood with reference to the flow charts shown in FIGS. 5 to 10. It is understood that this functionality can be adapted to any selected application such as in a production motor vehicle, mining operation, demolition operation, construction operation and so forth.

Figure 5:
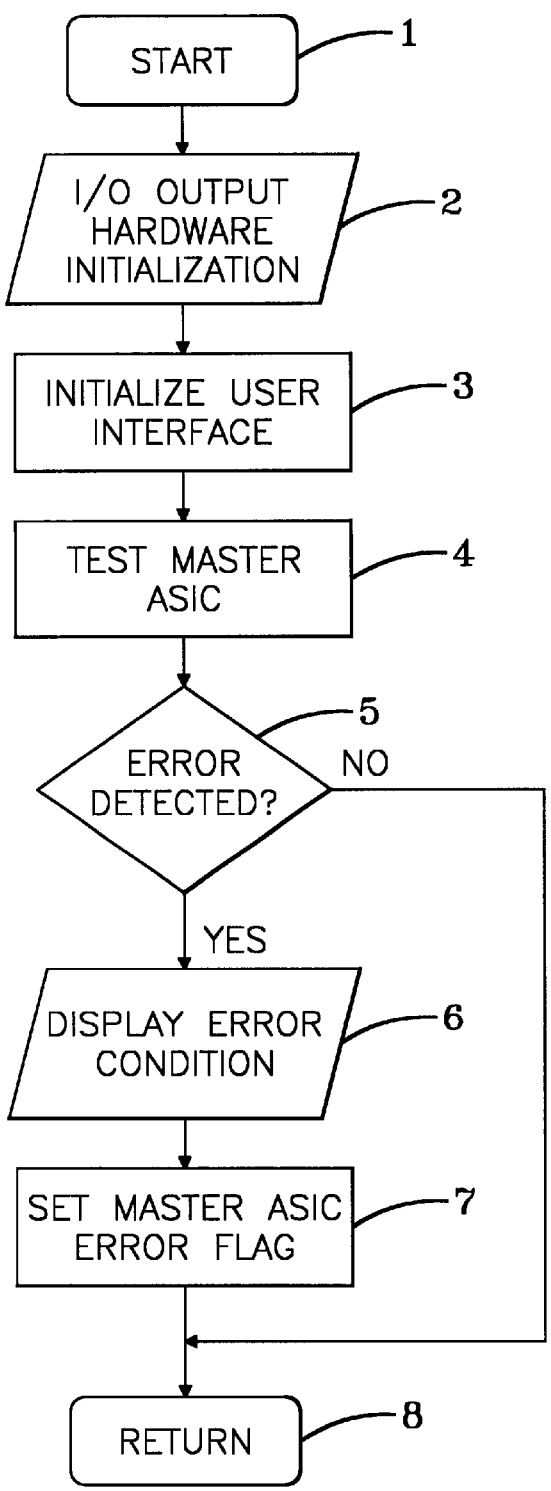
FIG. 5 is flow diagram of a software routine called "Init" which initializes the smart ignitor control hardware.

FIG. 5 shows a routine called "Init" which initializes the electronic input/output hardware in the smart ignitor control hardware, sets up the user interface, the electronic hardware and software tests the master ASIC communications to verify it is operational, and an error condition, if present, is displayed to the user. Referring to FIG. 1, FIG. 2 and FIG. 5, the routine called "Init" starts at block 1 when the computer program is first started in the electronic information processor 100 and initializes the electronic input/output hardware in the smart ignitor control hardware at block 2. The electronic input 211 /output hardware 210 in the smart ignitor control hardware shown in FIG. 1. At block 3 the user interface is set up and initialized. At block 4 the electronic hardware and software tests the master ASIC block 102, which is a custom integrated circuit that supplies power and communicates bi-directionally with a plurality of smart ignitors 103 (in the prototype device up to sixteen smart ignitors) connected to it through the smart ignitor bus 206. Thus the smart ignitors operational status is verified. A query is sent to the master ASIC then the electronic hardware and software receives the information from the master ASIC and verifies the content of this information is correct in block 5. If the content of the information is correct the routine exits in block 8. If the content of the information is incorrect an error condition is displayed to the user in block 6 and a master ASIC error flag is set in block 7. Then the routine exits in block 8.

Figure 6A:
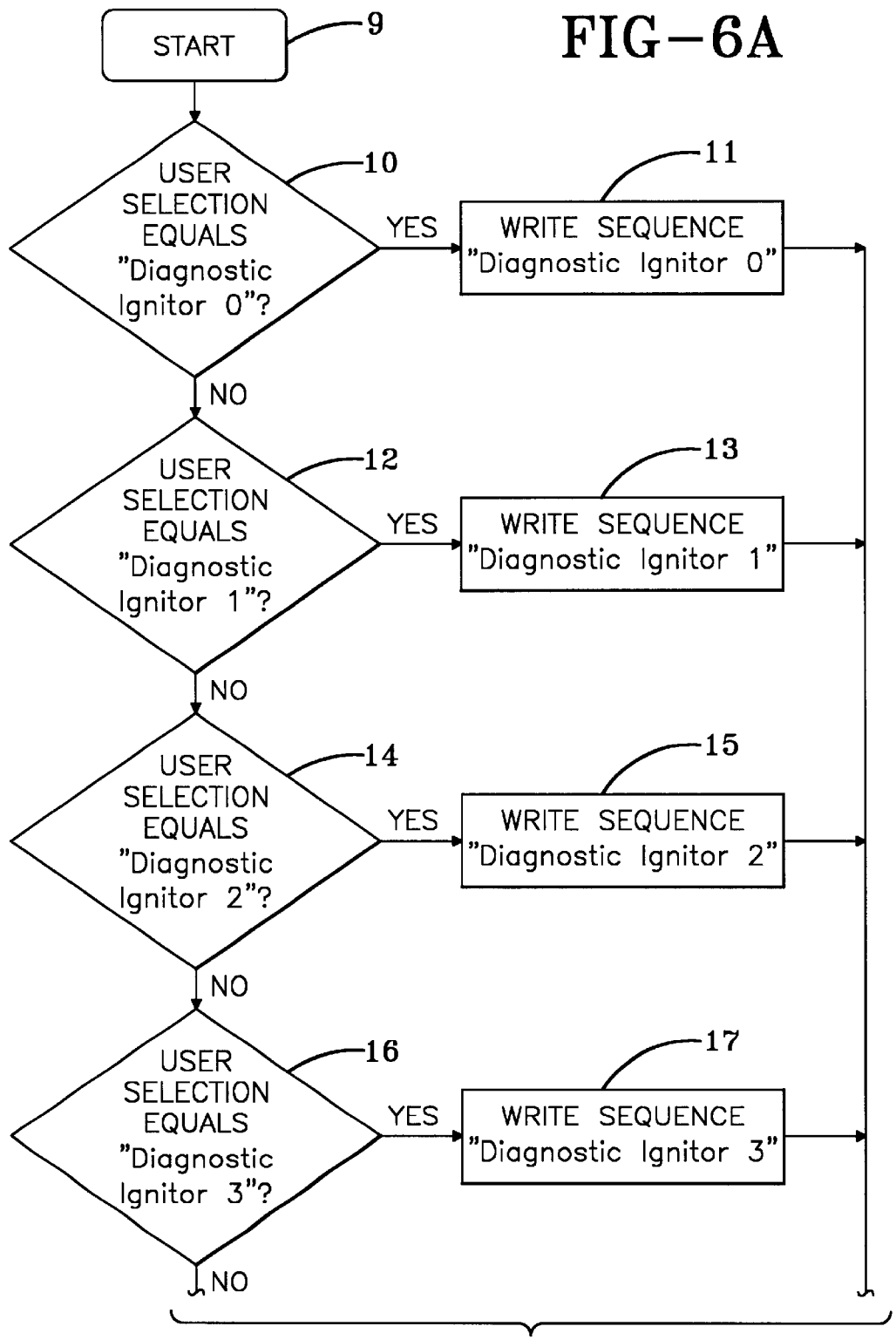
Figure 6B:
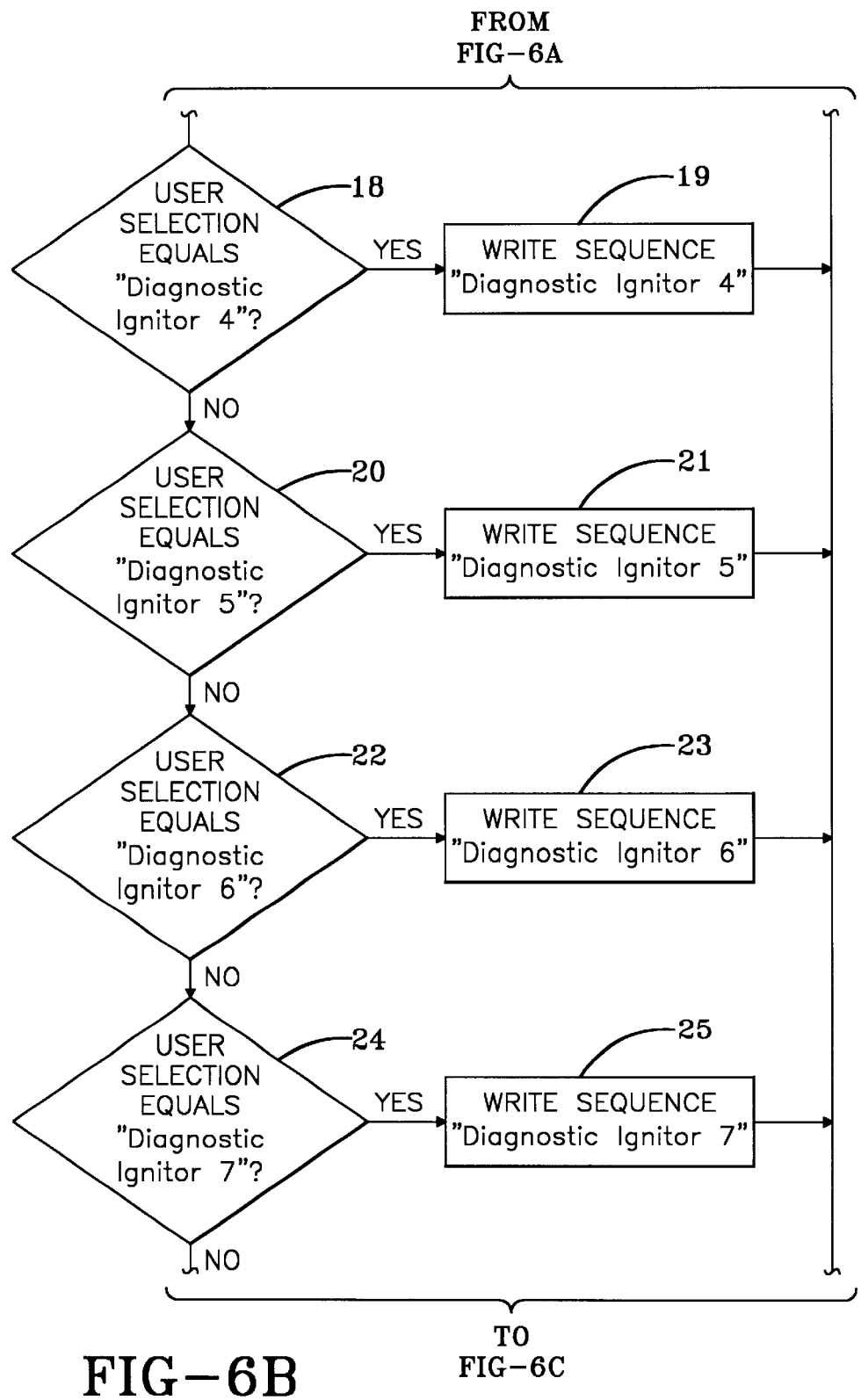
Figure 6D:
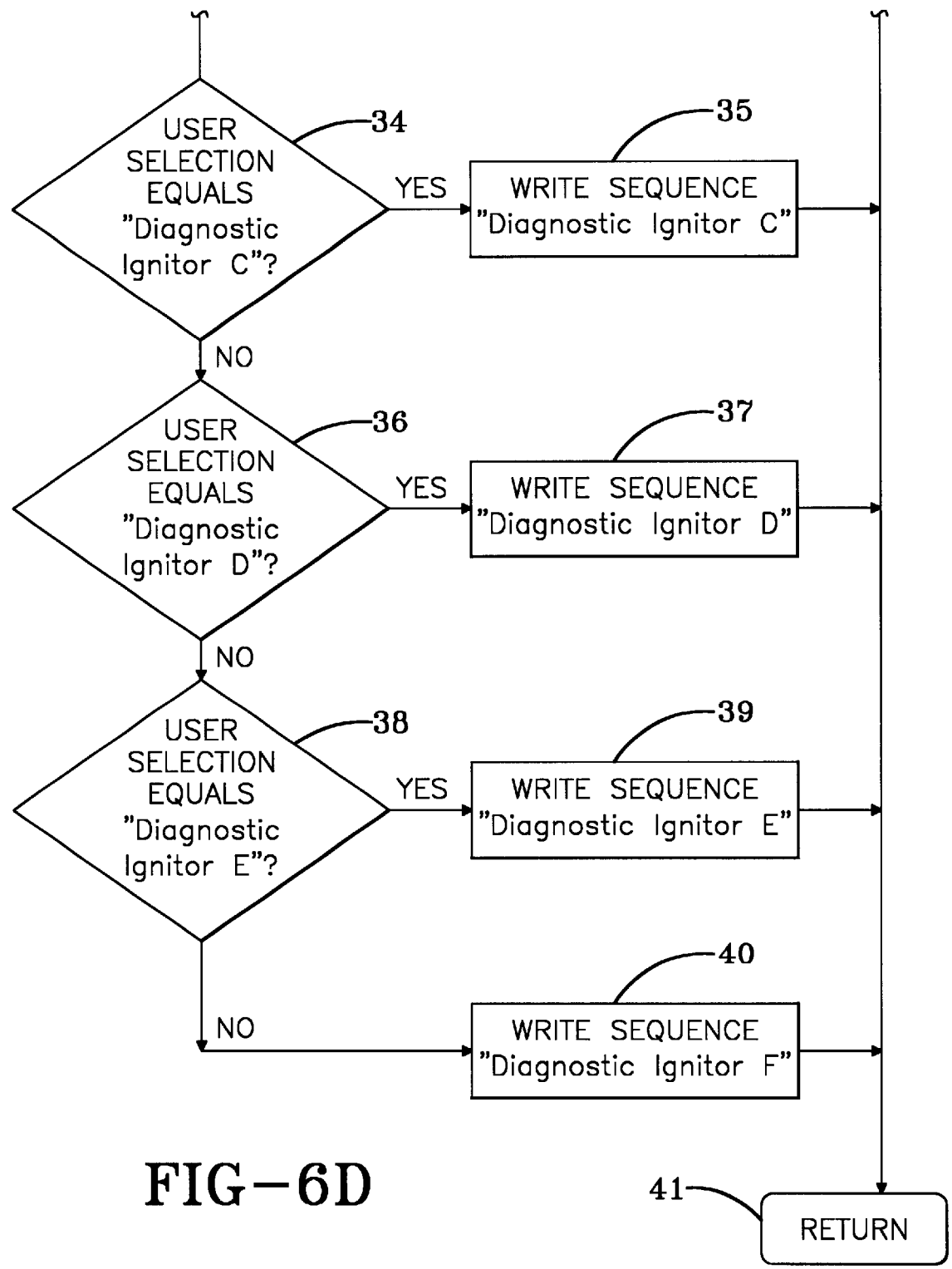

FIG. 6 shows a routine called "OnExecute" which is executed when the user selects a sequence from a pull-down control on the user interface. The selections displayed on the pull-down include diagnostic sequences on any of the up to sixteen connected smart ignitors. This routine performs the diagnostic sequence on the smart ignitor selected. Referring to FIG. 1 and FIG. 6, the routine called "OnExecute" is executed starting at block 9 when the user selects a sequence from a pull-down menu on the user interface. The selections displayed on the pull-down menu include diagnostic sequences on any one or combination of the smart ignitors 103. At block 10, if the "Diagnostic Ignitor 0" selection was chosen then the software and electronic hardware writes the sequence for diagnostic ignitor number 0 to ignitor 0 in block 11. The same conditional logic is applied in blocks 12 through 39. If none of the selections in blocks 10, 12, 14,16, 18, 20, 22, 24, 26, 28, 30, 32, 34, 36, or 38 are true, then block 40 is executed in that the software and electronic hardware writes the sequence for diagnostic ignitor number F (that is, ignitor number 15). After blocks 11, 13, 15, 17, 19, 21, 23, 25, 27, 29, 31, 33, 35, 37 or 39 are executed then the routine exits in block 41.

FIG. 7 shows a routine called "OnExecuteWrite" that is executed when the user initiates the sequence list control on the user interface is activated. Binary information that is to be sent to the MOSI serial data hardware node is stored in a MOSI software array (MOSI is the TTL (transistor-transistor logic) level serial command and data sent to the master ASIC and, when applicable, is sent by the master ASIC to one or more of the smart ignitors. Then the MOSI information is arranged so that the MSB (most significant bit) is sent to the master ASIC first. Then the pulse train length and logic of the SPI Clock is programmed and stored in the SPI Clock array. Next, the logic levels of the /CE signal is set up in the CE array. Then the D__C signal is set up in the D__C array. Next the contents of the MOSI software array, SPI Clock array, CE array, and the D__C array is stored in the data array. Referring to FIG. 1, FIG. 2 and FIG. 7, the routine called "OnExecuteWrite" is executed when the user initiates the sequence list control on the user interface and starts at block 42. At block 43 the binary information that is to be sent to the MOSI serial data hardware node 201 is stored in a MOSI software array. MOSI is the TTL (transistor-transistor logic) level serial command and data sent to the master ASIC and, when applicable, is sent by the master ASIC to one or more of the smart ignitors. At block 44 the format of the MOSI information is arranged so that the MSB (most significant bit) is sent to the master ASIC 102 first. At block 45 the pulse train length and logic of the SPI Clock is programmed and stored in the SPI Clock array. The SPI Clock is the serial TTL pulses that are sent to the master ASIC with the MOSI signals to supply the required timing for the communications. At block 46 the logic levels of the /CE signal (handshaking) is set up in the CE array. The /CE signal supplies chip enable logic information to the master ASIC. At block 47 the logic levels of the D__C signal is set up in the D__C array. The D__C signal supplies data/command logic information the master ASIC. In block 48 the contents of the MOSI software array, SPI Clock array, CE array, and the D__C array is stored in the data array. The routine exits in block 49.

Figure 3:
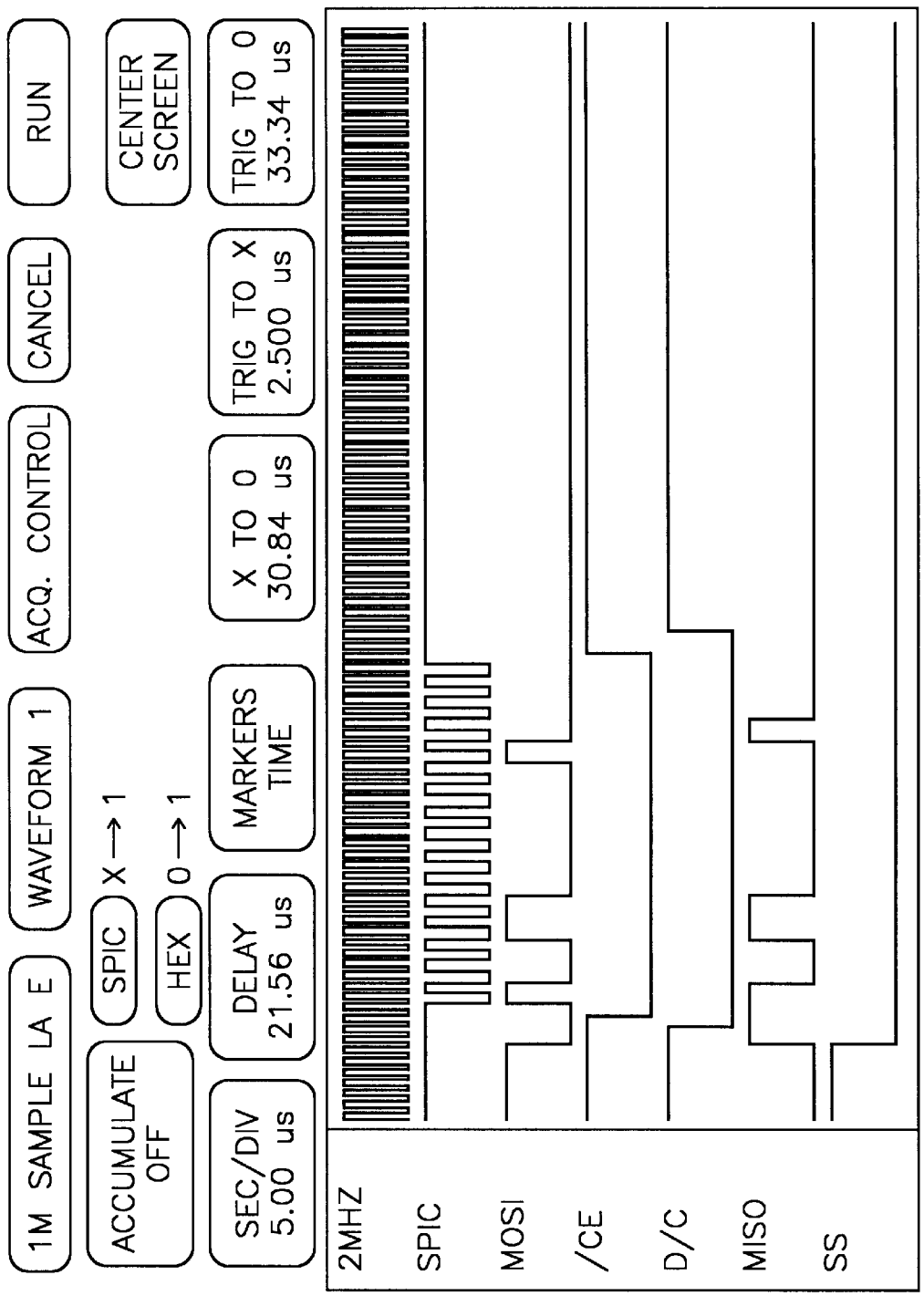
FIG. 3 is the smart ignitor SPI bus waveform showing data captured by a logic analyzer, the master ASIC output is also seen in this figure.

A first example of the MOSI data node is shown in FIGS. 3. FIG. 3 is the smart ignitor SPI Bus Waveform showing data captured by a logic analyzer for the "Bus On" command sent via the MOSI serial data node referenced to the SPI clock for timing. The master ASIC output is seen in this figure in the MISO serial data node.

Figure 4:
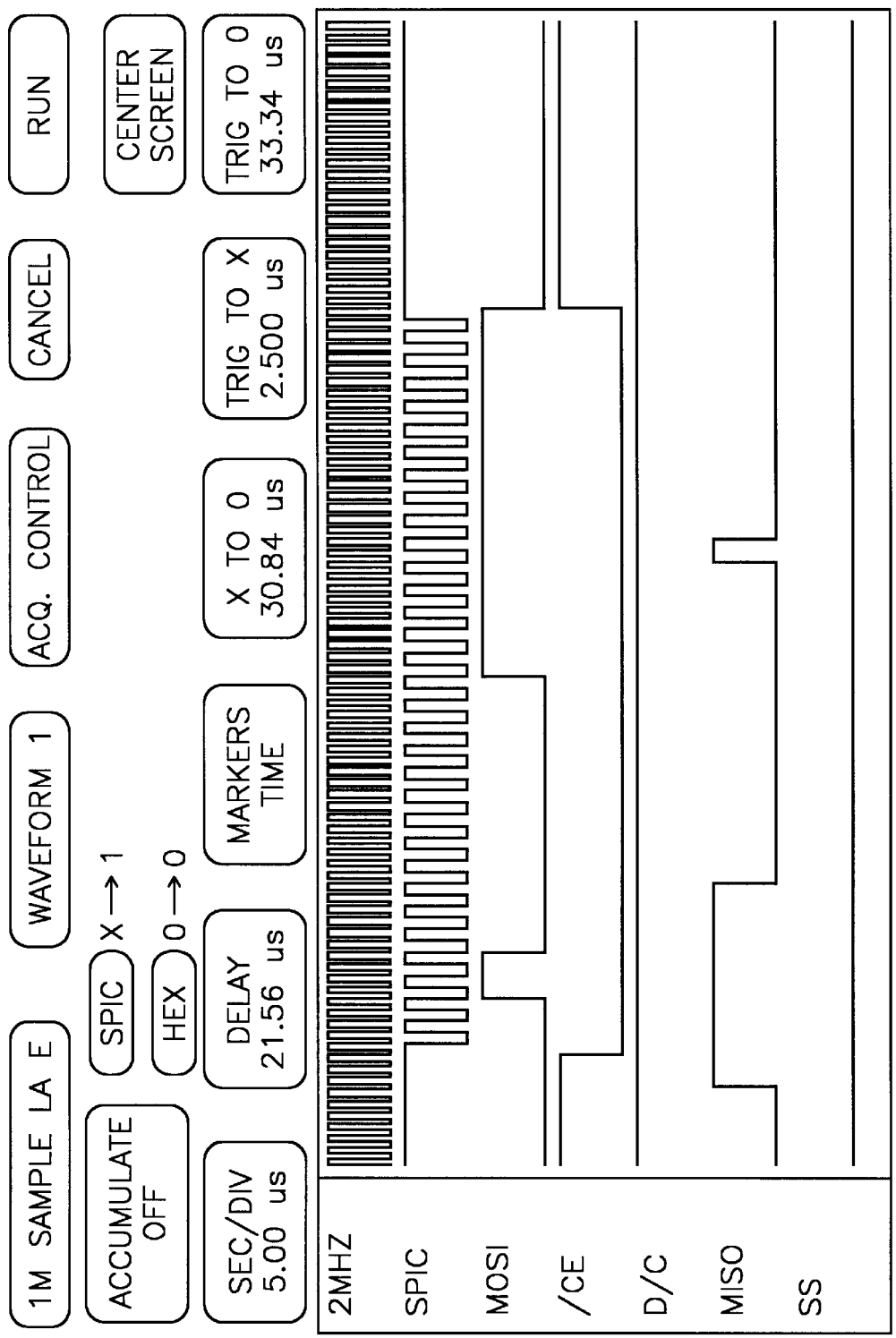
FIG. 4 is the smart ignitor SPI bus waveform showing data captured by a logic analyzer, the master ASIC output is also seen in this figure.

Another example of the MOSI data serial node is shown in FIG. 4. FIG. 4 shows the smart ignitor SPI Bus Waveform for data captured by a logic analyzer for the "Serial number 1 query" command sent via the MOSI serial data node referenced to the SPI clock for timing. The master ASIC output is seen in this figure in the MISO serial data node.

FIG. 8 shows a subroutine called "FlashWrt" that is executed when the user initiates the control button "EXECUTE" on the user interface. The contents of RAM #1 is cleared to remove any previously stored information and the electronic hardware for RAM #2 read functions are initialized. Then the content of the software data array is copied to the RAM #1 electronic hardware component. Then the content of the software delay functions is copied to the electronic delay hardware components. Then the binary contents of RAM #1 are sent by the electronic hardware to the inputs of the master ASIC. Referring to FIG. 2 and FIG. 8, the subroutine called "FlashWrt" is executed when the user initiates the control button "EXECUTE" on the user interface. The routine starts at block 50. At block 51 the contents of RAM #1 202 is cleared to remove any previously stored information and the electronic hardware for RAM #2 203 read functions are initialized. At block 52 the contents of the software data array in the electronic information processor 100 is copied to RAM #1. At block 53 the contents of the software delay functions are copied to the electronic delay hardware components 204. At block 54 the binary contents of RAM #1 are sent by the electronic hardware to the master ASIC 201. The routine exits in block 55.

Figure 9:
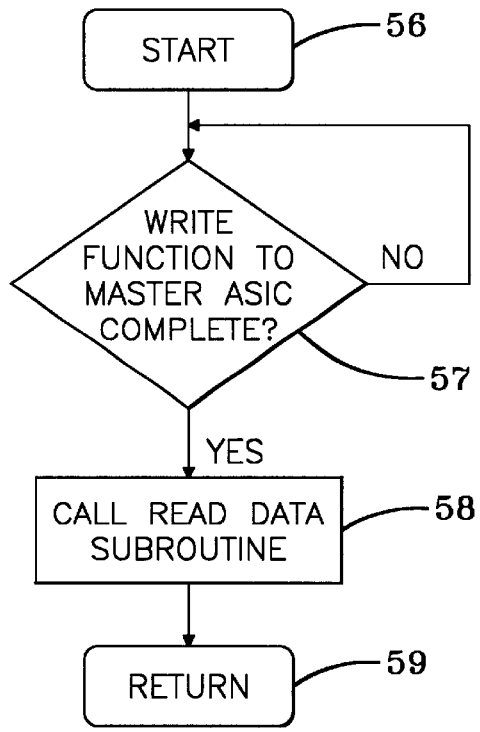
FIG. 9 is a flow chart of a software logic flow that starts the functions that read and store the binary output of the master ASIC into RAM #2.

FIG. 9 shows the software logic flow that starts the functions that read and store the binary output of the master ASIC into RAM #2. Referring to FIG. 2 and FIG. 9, the software logic flow that starts the functions that read and store the binary output 205 of the master ASIC 102 into RAM #2 203. The routine starts at block 56. At block 57 if the condition of the write function to the master ASIC is complete is TRUE then the "read data" routine is called as shown in block 58. If the condition is FALSE, the condition is retested. This routine exits after the return of the "read data" routine as shown in block 59.

Figure 10:
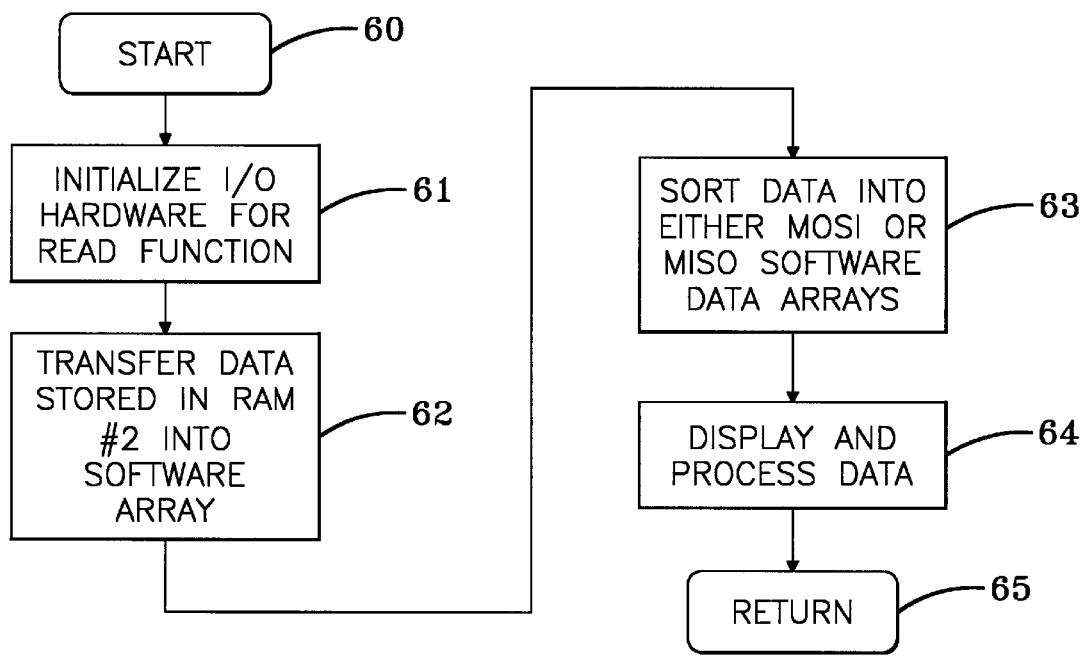
FIG. 10 is a flow chart of a software logic flow that copies the binary contents of RAM #2 to the computer.

FIG. 10 shows logic flow that copies the binary contents of RAM #2 to the computer. This logic sequence is executed after the completion of the electronic hardware transfer of binary information from the master ASIC to electronic component RAM #2. The software initializes electronic hardware the computer uses to copy the information contents of RAM #2 into the computer. Then the information stored on RAM #2 is copied into a software data array. Next the software sorts the data into either MOSI or MISO. The software displays and processes the MOSI and MISO data as required. Referring to FIG. 10, the logic flow that copies the binary contents of RAM #2 203 to the electronic information processor 100 and starts at block 60. This logic sequence is executed after the completion of the electronic hardware transfer of binary information from the master ASIC 102 to RAM #2. At block 61 the software initializes electronic hardware 223 the electronic information processor uses to copy the information contents of RAM #2 into the electronic information processor. At block 62 the information stored on RAM #2 is copied into a software data array. At block 63 the software sorts the data into either MOSI (the write data echoed back from the master ASIC) or MISO (data response from the master ASIC or from the smart ignitors through the master ASIC). At block 64 the software displays and processes the MOSI and MISO data as required. Some requirements may result in both MOSI and MISO data displayed on the computer screen, stored in files, databases, transferred through computer networks, or other operations. Data processing may include, but is not limited to, transferring operation status to the user or users by means of "PASS or FAIL" indications including text, light indicators, or accept/reject of the smart ignitor components or system. The routine exits in block 65.

The prototype was made using discrete components that were interconnected with wire-wrap. However; it is understood that the same functions can be accomplished using microprocessor or microcontroller devices or any other suitable devices.

While certain representative embodiments and details have been presented for the purpose of illustrating the invention, it will be apparent to those skilled in the art that various changes and modifications may be made therein without departing from the spirit and scope of the invention.

We claim:

1. A smart ignitor control system comprising:
    an electronic information processor supplying output serial clock, data, and handshaking signals to a first memory device:
        a communications output electronic circuitry that generates output serial clock, data, and handshaking signals by reading data out from the first memory for communication with a master ASIC that communicates with a plurality of smart ignitors over a data bus the communications output electronic circuitry comprising:
            data interface circuitry connecting the electronic information processor to the first memory device;
            data interface circuitry for connecting the master ASIC to the first memory device, and
            control circuitry controlling the functions of the interface circuitry and the first memory device; and
        a communications input electronic circuitry that inputs data and handshaking signals from the master ASIC electronic circuit to a second memory device, comprising:
            data interface circuitry connecting the electronic information processor to the second memory device,
            data interface circuitry for connecting the master ASIC to the second memory device, and
            control circuitry controlling the functions of the interface circuitry and second memory device.

2. The smart ignitor control system of claim 1 further comprising a circuit that digitizes analog voltages and waveforms from the ignitor bus, stores the digitized data in a third memory device then uploads the digitized data to the electronic information processor.

3. A smart ignitor control system comprising:
    a computer supplying output serial clock, data, and handshaking signals to a first memory device;
        a communications output electronic circuitry that outputs serial clock, data, and handshaking signals by reading data out from the first memory device for communication with a master ASIC that communicates with a plurality of smart ignitors over a data bus, the communications output electronic circuitry comprising:
            data interface circuitry connecting the computer to the first memory device;
            data interface circuitry connecting master ASIC to the first memory device, and
            control circuitry controlling the functions of the data interface circuitry and the first memory device;
        communications input electronic circuitry that inputs data, and handshaking signals from the master ASIC to a second memory device comprising:
            data interface circuitry connecting the computer to the second memory device, and
            control circuitry controlling the functions of the interface circuitry and second memory device; and
        a software program executed by the computer that performs the following functions:
            supplying output serial clock, data, and handshaking signals to the first memory device, and
            input the data stored in the second memory device, and
            decoding, analyzing, displaying, archiving, and linking the data in the second memory device to an electronic information processor screen.

4. A system for communicating with a plurality of smart ignitors, comprising;
    a computer,
    a first memory in communication with said computer, said first memory storing a plurality of communication signals;
    a master ASIC connected to said first memory to receive said plurality of communication signals;
    a plurality of smart ignitors, each ignitor having a unique address, said plurality of smart ignitors being connected by a single pair of leads forming a bus, to the master ASIC;
    a second memory operatively connected to the master ASIC to receive data transmitted from each of said plurality of smart ignitors;
    the computer operatively connected to the second memory to interrogate and display said data transmitted from each of said plurality of smart ignitors and stored in said second memory;
    a voltage monitoring circuit connected to the bus formed by the single pair of leads;
    an A/D converter connected between said voltage monitoring circuit and a third memory for receiving and storing the digital value of the voltage of the bus, and wherein the computer is operatively connected to the third memory to interrogate and display the digitized value of the voltage of the bus.

5. The system of claim 4 wherein the plurality of communications signals stored in the first memory includes serial lock, data, and handshaking signals.

6. The system of claim 4 wherein the first memory is of the flash type.

* * * * *